United States Patent [19]

Wong

[11] Patent Number: 5,159,819
[45] Date of Patent: Nov. 3, 1992

[54] PALM SIZED AIR CONDITIONER

[76] Inventor: Charles Y. H. Wong, 95-262 Waioleka St., #26, Mililani, Hi. 96789

[21] Appl. No.: 713,956

[22] Filed: May 13, 1991

[51] Int. Cl.⁵ ............................................. F25D 17/06
[52] U.S. Cl. ..................................... 62/419; 62/425; 62/457.1; 62/466
[58] Field of Search .............. 62/419, 420, 425, 457.1, 62/457.9, 466

[56] References Cited

U.S. PATENT DOCUMENTS

| 2,564,998 | 8/1951 | Sayers | 62/425 |
| 2,749,725 | 6/1956 | Essman et al. | 62/406 |
| 2,802,347 | 8/1957 | Marcus | 62/425 |
| 3,043,116 | 7/1962 | Fuller | 62/420 |
| 3,164,971 | 1/1965 | Gentz | 62/406 |
| 4,468,932 | 9/1984 | Bullard | 62/459.9 |

FOREIGN PATENT DOCUMENTS 638776 6/1928 France .
2122336 11/1984 United Kingdom .

Primary Examiner—Ronald C. Capossela
Attorney, Agent, or Firm—Michael I. Kroll

[57] ABSTRACT

The present invention relates to a palm-sized air conditioner. The palm-sized air conditioner includes a housing having a top with a vent; batteries are disposed within the housing; an ice chamber is disposed within the housing; a box fan moves air at room temperature through the ice chamber to produce cool air; and vertically adjustable horizontal vanes for receiving the cool air while the box fan passes the cool air up and out of the vent.

7 Claims, 2 Drawing Sheets

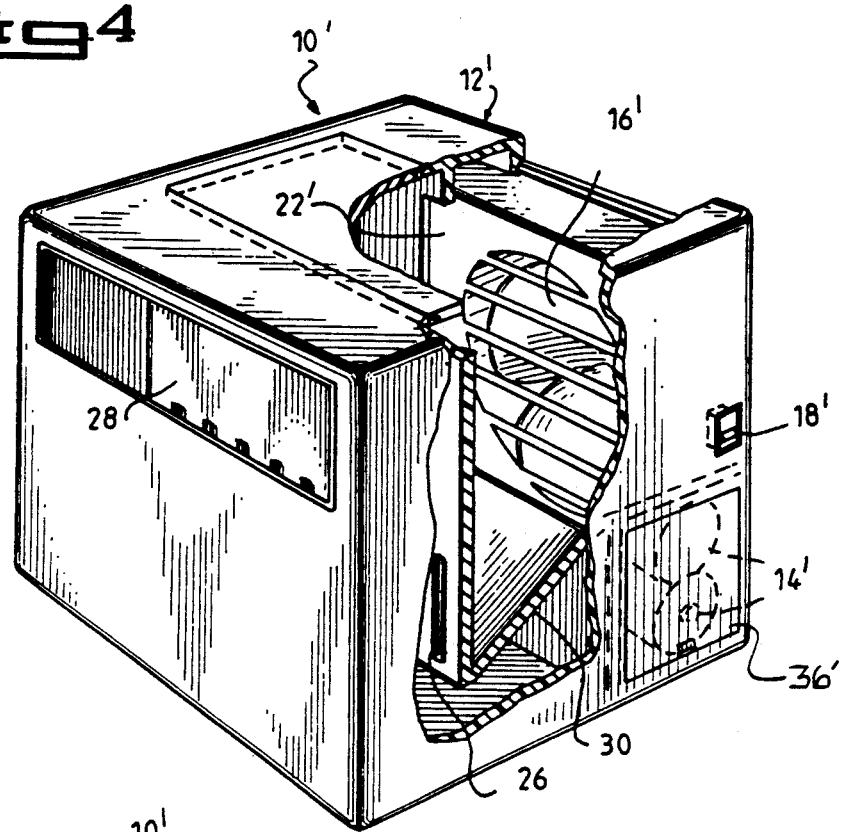
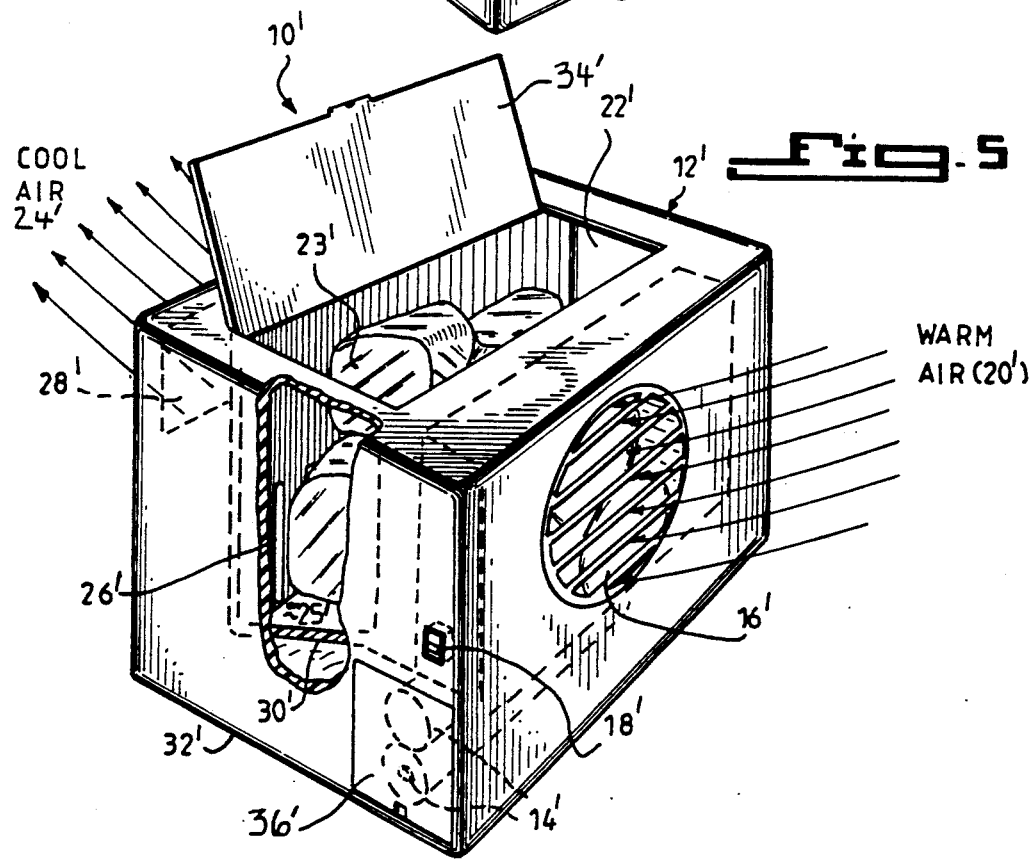

PALM SIZED AIR CONDITIONER

BACKGROUND OF THE INVESTION

1. Field of the Investion

The present invention relates to an air conditioner.

More particularly, the present invention relates to a palm-sized air conditioner.

2. Description of the Prior Art

Numerous innovations for air conditioners have been provided in the prior art that are adapted to be used. Even though these innovations may be suitable for the specific individual purposes to which they address, they would not be suitable for the purposes of the present invention as heretofore described.

SUMMARY OF THE INVESTION

Accordingly, it is an object of the present invention to provide an air conditioner that avoids the disadvantages of the prior art.

More particularly, it is an object of the present invention to provide a palm sized battery run toy air conditioner, for dog houses, dog carriers, tree houses, pup tents, dressing tables, desk tops, etc.

The vertically adjustable horizontal vanes allow cooled air to be directed at various height levels desired. Also, the floor grill automatically cuts the flow of air when the melted water level rises, thus warning of overflow.

In keeping with these objects, and with others which will become apparent hereinafter, one feature of the present invention resides, briefly stated, in a palm sized air conditioner, including a housing having a top with a vent; batteries disposed within the housing; an ice chamber disposed within the housing; a box fan moving air at room temperature through the ice chamber to produce cool air wherein a grill receives the cool air, the box fan passing the cool air up and out of the vent.

When the palm-sized air conditioner is designed in accordance with the present invention, an air conditioner is provided, dog houses can be kept cool, dog carriers can be kept cool, tree houses can be kept cool, and pup tents can be kept cool, etc.

In accordance with another feature of the present invention, it further includes an on/off switch for the box fan.

Another feature of the present invention is that it further includes an ice door provided on the housing for loading of the ice.

Yet another feature of the present invention is that it further a door provided on the housing for the egression of the batteries.

Still another feature of the present invention is that the ice compartment is fillable with ice.

Yet still another feature of the present invention is that the housing is substantially triangularly shaped.

Still yet another feature of the present invention is that the housing is substantially cubic shaped.

The novel features which are considered characteristic for the invention are set forth in particular in the appended claims. The invention itself, however, both as to its construction and its method of operation, together with additional objects and advantages thereof, will be best understood from the following description of the specific embodiments when read in connection with the accompanying drawing.

Figure 1:
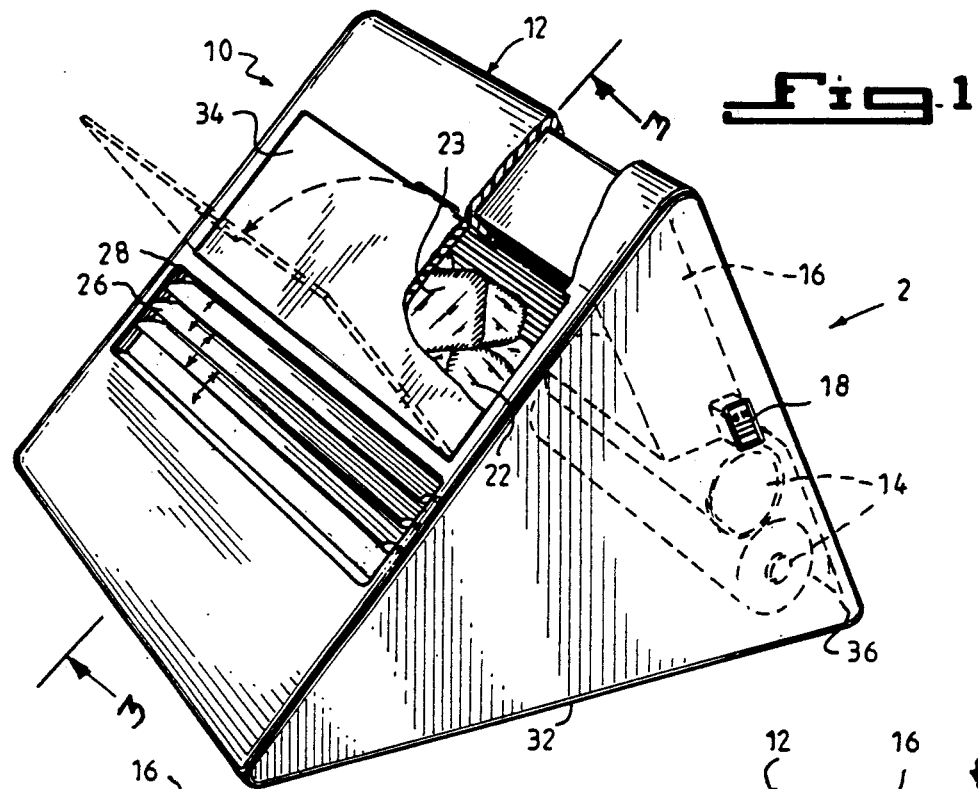
FIG. 1 is a partially cutaway perspective view of the palm-sized air conditioner of the present invention.
Figure 2A:
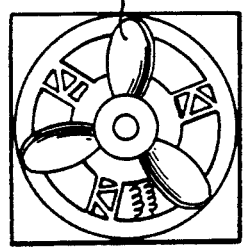
FIG. 2 is another cutaway perspective view of the palm-sized air conditioner of the present invention taken in the direction of arrow 2 in FIG. 1.
Figure 2:
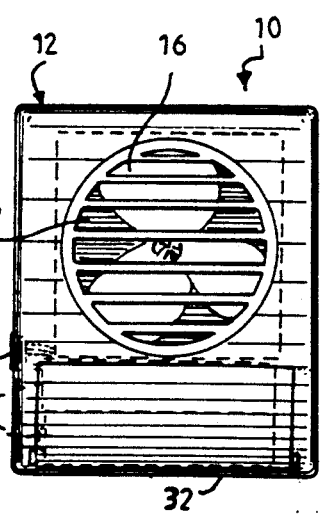
Figure 3:
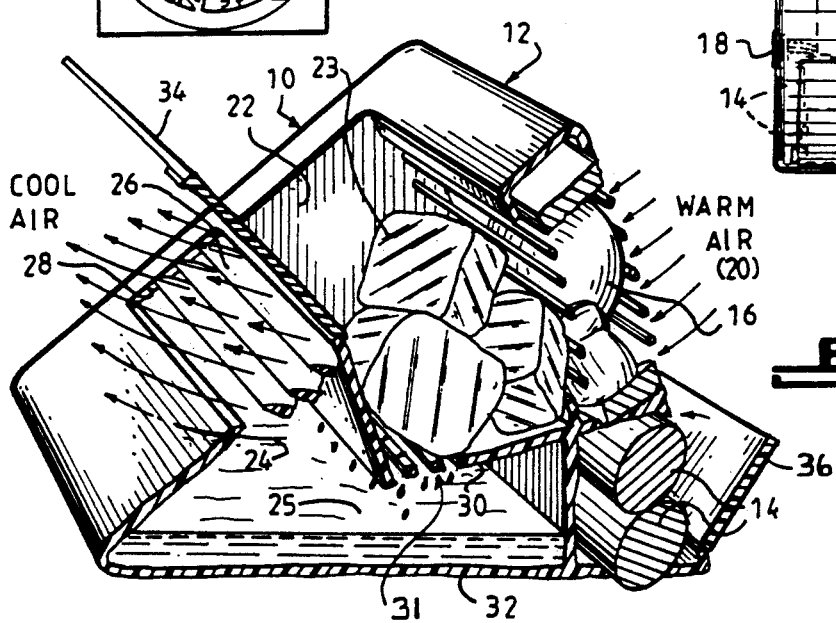

2A is a front view of the fan of the palm sized air conditioner of the present invention;

FIG. 3 is a side view taken along line 3–3 in FIG. 1;

FIG. 4 is a partially cutaway perspective view of an alternate embodiment of the present invention shown in FIGS. 1 through 3; and FIG. 5 is another partially cutaway perspective view of the alternate embodiment of the present invention shown in FIG. 4.

LIST OF REFERENCE NUMERALS UTILIZED IN THE DRAWING

10 — palm-sized air conditioner of the present invention
12 — substantially triangular housing of the palm-sized air conditioner 10 of the present invention
14 — batteries
16 — box fan
18 — on and off switch
20 — room temperature air
22 — ice chamber
23 — ice cubes
24 — cooled air
26 — vertically adjustable horizontal vanes
28 — vent
30 — inclined floor
31 — floor grill
32 — bottom
34 — door to the ice compartment 22
36 — door to the batteries 14
10′ — alternate embodiment of the palm-sized air conditioner of the present invention
12′ — substantially cubic housing of the alternate embodiment of the palm-sized air conditioner 10′ of the present invention
14′ — batteries
16′ — box fan
18′ — on and off switch
20′ — room temperature air
22′ — ice chamber
23′ — ice cubes
24′ — cooled air
26′ — grill
28′ — vents
30′ — inclined floor
32′ — bottom
34′ — door to the ice compartment 22′
36′ — door to the batteries 14′

DETAILED DESCRIPTION OF THE PREFERRED EMBODIMENT

Referring now to FIGS. 1 through 3, the palm-sized air conditioner of the present invention is generally shown at 10.

The substantially triangular housing 12 contains batteries 14 which power the box fan 16, via an on and off switch 18. The box fan 16 moves air, at room temperature 20, through ice chamber 22 filled with ice 23. The cooled air 24 passes through the floor grill 31 and up and out vertically adjustable horizontal vanes 26 and vent 28.

As the ice melts 25, the inclined floor 30 causes the remaining ice cubes 23 to slide down against the floor grill 31. Thus, continually positioning fresh ice 23 in the path of the warm air 20 which optimizes the cooling effect.

The melted ice water 25 drips through floor grill 31 and collects at the bottom 32 of the substantially triangular housing 12. Refreezable sealed ice ("blue ice", etc.) may be substituted to minimize water residue 25.

A door 34 is provided to allow egress to the ice compartment 22 for refilling with ice 23 and a door 36 is provided to allow egress for the batteries 14.

Referring now to FIGS. 4 and 5, the alternate embodiment of the palm-sized air conditioner of the present invention is generally shown at 10'.

The substantially cubic housing 12' contains batteries 14' which power the box fan 16', via an on and off switch 18'. The box fan 16' moves air, at room temperature 20', through ice chamber 22', filled with ice 23'. The cooled air 24' passes through the grille 26' and up and out vents 28'.

As the ice 23' melts 25' the inclined floor 30' causes the remaining ice cubes 23' to slide down the inclined floor 30 up against the grill 26'. Thus, continually positioning fresh ice 23' in the path of the warm air 20' which optimizes the cooling effect.

The melted ice water 25' drips through the grill 26' to collect at the bottom 32' of the substantially cubic housing 12'. Refreezable sealed ice ("Blue Ice", etc.) may be substituted to minimize water residue 25'.

A door 34' is provided to allow egress to the ice compartment 22' for refilling with ice 23', and a door 36 is provided to allow egress for the batteries It will be understood that each of the elements described above, or two or more together, may also find a useful application in other types of constructions differing from the type described above.

While the invention has been illustrated and described as embodied in an air conditioner, it is not intended to be limited to the details shown, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. A palm sized air conditioner for the introduction of cooled air for personal comfort, comprising:
   (a) a housing having a front with an ingress point and a rear with an egress point, and an inclined floor;
   (b) batteries disposed within said housing;
   (c) an ice chamber disposed within said housing and containing ice fragments with crevices and cracks;
   (d) a box fan moving air at room temperature through said ice chamber to produce cool air; and
   (e) vertically adjustable horizontal vanes for receiving said cool air, said box fan passing said cool air up and out of said vent, said vertically adjustable horizontal vanes for receiving said cool air being always at the same elevation as and colinear with said box fan for moving said air at room temperature so that air flow through said minute cracks and said crevices that naturally occur whenever said separate ice fragments of random size and shapre are clustered together and thus allowing the use of any available ice, said inclined floor causes said ice fragments to continually slide down and settle at said vent which places said ice directly in the path of said airflow at all times and constantly produces a cooling effect so long as any particles of said ice remain.

2. An air conditioner as defined in claim 1; further comprising an on/off switch for said box fan.

3. An air conditioner as defined in claim 2; further comprising an ice door provided on said housing for loading ice.

4. An air conditioner as defined in claim 3; further comprising a door provided on said housing for the egression of said batteries.

5. An air conditioner as defined in claim 4; wherein said ice compartment is fillable with ice.

6. An air conditioner as defined in claim 1; wherein said housing is substantially triangularly shaped.

7. An air conditioner as defined in claim 1; wherein said housing is substantially cubic shaped.

* * * * *